UNITED STATES PATENT OFFICE.

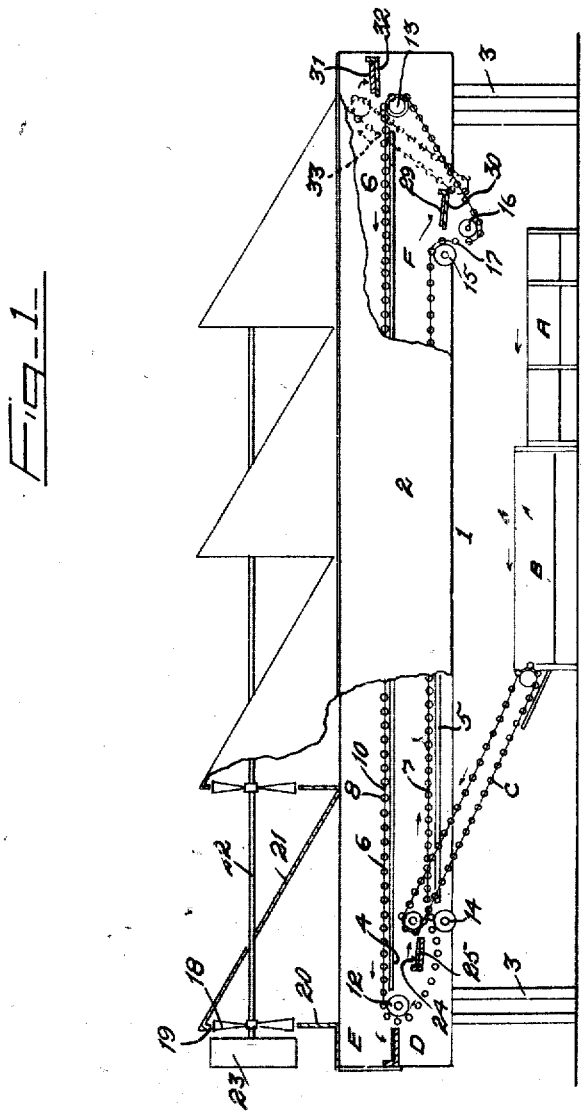

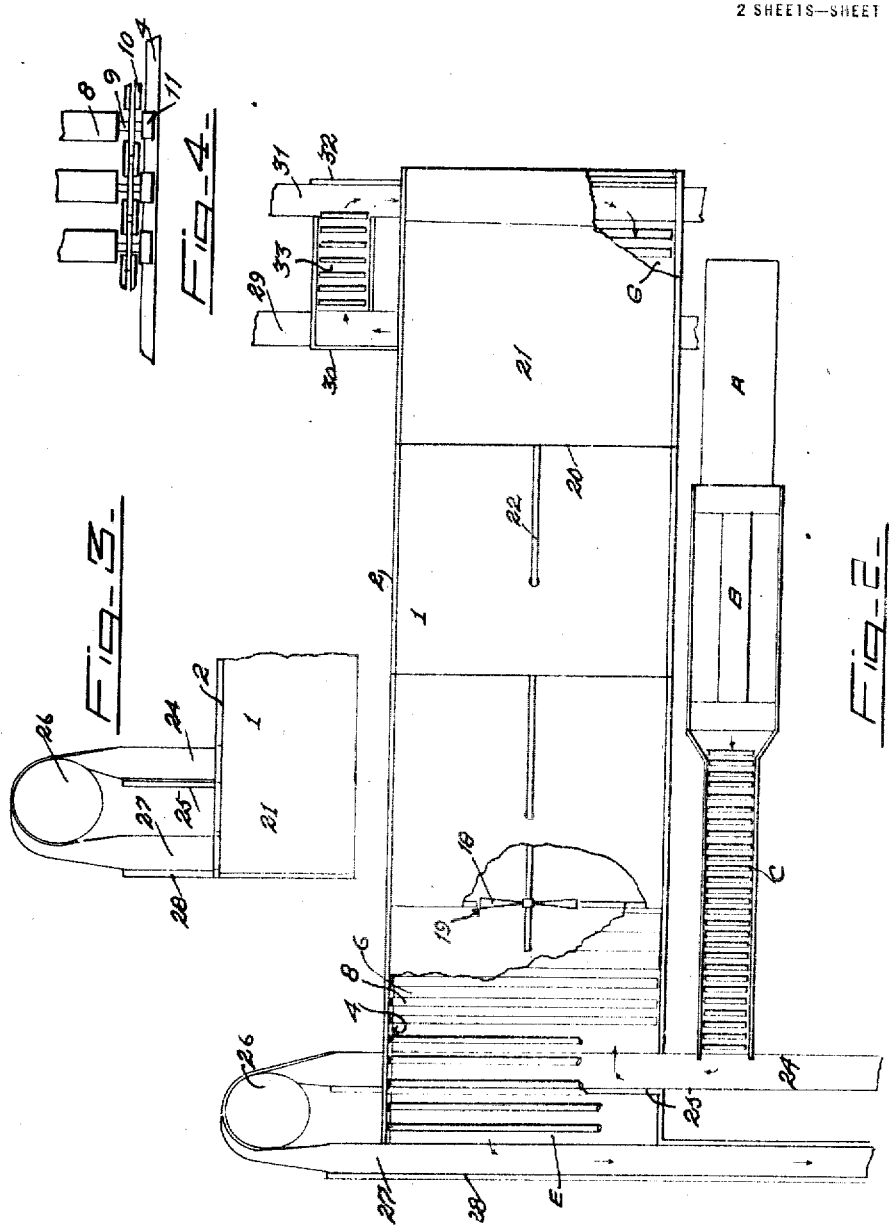

GEORGE D. PARKER, OF RIVERSIDE, CALIFORNIA.

DRYING APPARATUS FOR FRUIT.

1,266,983.   Specification of Letters Patent.   Patented May 21, 1918.

Application filed October 23, 1917. Serial No. 198,005.

*To all whom it may concern:*

Be it known that I, GEORGE D. PARKER, a citizen of the United States, residing at Riverside, in the county of Riverside and State of California, have invented certain new and useful Improvements in Drying Apparatus for Fruit, of which the following is a specification.

The present invention relates to driers of the conveyer type, designed particularly for the drying of washed fruit and of the type set forth in my copending application Serial No. 177,223, filed June 27, 1917. The invention has for its principal objects to provide a drier of large capacity and wherein the fruit rests on an endless conveyer of a plurality of flights and is conveyed through the drier housing preferably from one end to the other thereof in a horizontal plane, and is successively transferred from the upper surface of the lower flight of said conveyer, to the upper surface of the next succeeding flight immediately above the same, thus lengthening the period of time of the travel of the fruit through the drier without reducing the speed of the conveyer and without increasing the floor space for the drier over that required in the driers now in universal use.

The invention consists primarily in providing in a drier, a plurality of superimposed conveyer flights moving successively in opposite directions longitudinally of the conveyer housing and employing in connection therewith means for transferring the fruit from the upper surface of one end of the lower flight onto the surface of the corresponding end of a flight immediately above the same, whereby the fruit rests on and is conveyed successively from end to end in the drier housing alternately in opposite directions and is elevated within said housing, being subjected to a drying element in its travel within the housing.

With the above mentioned and other objects in view, the invention consists in the novel construction and combination of parts hereinafter described illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein, Figure 1 is a view in broken side elevation, illustrating the preferred embodiment of my invention, arranged in coöperating relation, with soaking and washing tanks, in which the fruit is treated prior to drying the same.

Fig. 2 is a view in broken top plan of the construction illustrated in Fig. 1.

Fig. 3, is a view in detail of the transfer conveyer for delivering the washed fruit from the elevator leading from the washer on to the lower run of the drying conveyer, and for removing the dried fruit from the upper run of said conveyer.

Fig. 4 is a view in detail of one end of several of the rolls constituting the drier conveyer.

Referring more particularly to the several views of the drawings, wherein like characters of reference designate corresponding parts, 1, indicates a suitable drier housing comprising the side walls 2, supported by the legs 3 or other suitable standards. To the inner face of the side walls 2 of the housing 1, are secured the longitudinally extending parallel spaced upper and lower track-ways 4 and 5, which support respectively the upper and lower flights 6 and 7 of a suitable endless conveyer, which conveyer is preferably formed of parallel spaced supporting rolls 8, extending transversely of the drier housing, and each roll is provided on it opposite end with a bearing 9 rotatable in a suitable bearing link of a connecting chain 10. The extreme opposite ends of the rolls 8 are provided with supporting rollers 11 which run on the track-ways 4 and 5, and cause the rolls 8 to be rotated and rotate the fruit resting thereon during the movement of the respective conveyer flights in opposite directions longitudinally of the housing.

Suitable pulleys 12 and 13 at opposite ends of the housing, and over which the endless conveyers travel support the same, and one of said pulleys is driven in any suitable manner to cause the conveyer to travel in the direction of the arrow, Fig. 1 of the drawings. The lower run 7 operates over the supporting idler pulley 14, at one end of the trackway 5, and at the opposite end of the trackway, operates over a similar idler 15 and under a corresponding idler 16, positioned below said idler 15 which causes a step 17 to be formed at one end of said lower conveyer flight 7.

In the present disclosure the drying medium employed is air supplied by fans 18, positioned in openings 19 in the vertical cover walls 20, the air being directed downwardly onto the fruit as conveyed by the downwardly inclined cover walls 21, the air passing over and around the fruit, and between the conveyer rolls and discharging from the drier housing through the open bottom thereof. The fans 18 are all mounted on a single shaft 22, driven by power applied to the band wheel 23 at one end thereof. It will thus be apparent that the fruit on the upper run is subjected to the drying air prior to the same having absorbed moisture, while the air passing between the rolls 8 of the upper run absorbs the moisture from fruit supported thereby and thus contains a certain degree of moisture prior to contacting with the fruit on the lower run.

The fruit to be treated, after remaining in the soaking tank A for a period sufficient to loosen the foreign material on the surface thereof, is delivered into a washer B of any well-known type, designed for washing fruit, and after passing therethrough is removed therefrom, by a suitable upwardly extending endless elevator C arranged at one side of the housing 1. The discharge end of the elevator C delivers the washed fruit on to the upper run 24 of a suitable endless belt, movable longitudinally of a support 25, extending transversely between the upper and lower conveyer belts 6 and 7, adjacent the receiving end D of the drier housing. The endless belt operates at its ends over the supporting pulleys or drums 26, one of which is illustrated in Fig. 3 of the drawings, and which is operated in any suitable manner to drive the belt in the direction of the arrow, Fig. 3. The return run 27, of said endless belt, moves longitudinally of a guide or support 28, disposed transversely of the discharge end E of the upper flight 6 of the drying conveyer to receive the dried fruit therefrom and convey the same to any suitable apparatus if further treatment of the same is necessary or desired. It will be apparent that the wet fruit from the washer, is delivered on to one end of the upper surface of the lower run 7, which permits drippings therefrom to pass from the rollers and through the open bottom of the drier housing without wetting or moistening any of the fruit after the same has been subjected to the drying medium.

Extending transversely of the discharge end F of the conveyer run 7 immediately above the idler 6 is another conveyer similar to that illustrated in Fig. 3 of the drawings, consisting of an endless traveling belt, the lower run 29 of which moves longitudinally of a support 30, and receives the fruit from the discharge end of the lower flight 7 after being conveyed once longitudinally of the drier housing. The upper flight 31 of said endless conveyer extends transversely of the receiving end G of the uppermost conveyed flight 6, and moves longitudinally of a guide 32 and delivers the partly dried fruit from the upper surface of the lower run on to the upper surface of the receiving end of the upper flight or run 6, which will convey it longitudinally of the drier housing and during its movement will be subjected directly to the drying air currents prior to the same becoming impregnated with moisture. An elevator 33, of the endless type and operating in the direction of the arrow Fig. 1 and 2 of the drawings, elevates the fruit from the lower run 29 to the upper run 31 of said endless conveyer.

By elevating the fruit successively from one flight of the conveyer to another traveling in opposite directions within the drier housing any drip from the fruit will pass through the open bottom of the drier housing while the fruit is being conveyed on the lower flight and as successively elevated the fruit will become drier and will be subjected to drying air containing less moisture, as it is moved in closer proximity to the drying medium.

While I have illustrated a drier conveyer having two flights or runs, one arranged above the other, it is understood the greater the number of runs or flights employed, the greater the distance of travel of fruit longitudinally of the drier housing is obtained without increasing the length of said housing, so if greater efficiency is required more flights or runs may be employed without departing from the spirit of my invention.

Having thus described my invention, what I claim as new and desire to protect by Letters Patent is:

1. A drier comprising a housing, means for feeding fruit to be dried thereto, an endless movable means within said housing for supporting and conveying the fruit therein alternately and in opposite directions from one end to the opposite end of said housing in successively higher horizontal planes, and means for drying the fruit as it is conveyed through said housing.

2. A drier, comprising a housing, an endless conveyer within said housing and divided into a plurality of horizontally disposed longitudinally movable flights extending longitudinally thereof and arranged one above the other, means for feeding fruit to be dried onto the upper surface of one end of the lowermost flight, means for transferring the fruit from the upper surface of the opposite end of the lowermost flight onto the upper surface of the corresponding end of a corresponding flight immediately above the same, means for removing the fruit from the upper surface of the opposite end of said last mentioned flight, and means for drying the fruit as conveyed.

3. A drier comprising a housing, an endless conveyer divided into a plurality of horizontally disposed superimposed flights extending longitudinally within said housing, succeeding flights of said conveyer commencing at the lowermost traveling in opposite directions, means for feeding fruit to be dried onto the upper surface of the lowermost flight, means for transferring the fruit from the upper surface of the lower flight onto the upper surface of a corresponding flight immediately above the same, means for drying the fruit as conveyed, and means for rotating the fruit as conveyed and dried.

4. A drier comprising a housing, a conveyer supporting roller at each end thereof, an endless conveyer passing around said rollers and supported thereby, and comprising a plurality of interconnected parallel spaced rollers capable of independent rotation and on which the fruit to be treated rests, said conveyer supporting rollers dividing the conveyer into upper and lower flights, means for operating said flights in opposite directions, means for supplying fruit to be dried to one end of the upper surface of said lowermost flight, elevating means for transferring the fruit from the opposite end of said lowermost flight to the upper surface of the adjacent end of the upper flight, means for removing the fruit from the opposite end of said upper flight, means for rotating said conveyer rolls to rotate the fruit as conveyed, and means for passing an air current through said housing for drying the fruit as conveyed.

5. A drier comprising a housing, a conveyer supporting roller at each end thereof, an endless conveyer passing around said rollers and supported thereby, and comprising a plurality of inter-connected parallel spaced rollers capable of independent rotation on which the fruit to be treated rests, said conveyer supporting rollers dividing the conveyer into upper and lower flights, means for operating said flights in opposite directions, means for supplying fruit to be dried to one end of the upper surface of said lowermost flight, elevating means for transferring the fruit from the opposite end of said lowermost flight to the upper surface of the adjacent end of the upper flight, means for removing the fruit from the opposite end of said upper flight, means for rotating said conveyer rolls to rotate the fruit as conveyed; and means for passing an air current downwardly through said housing and between the rolls of said conveyer for drying the fruit as conveyed.

6. A drier comprising a housing, an endless conveyer therein, providing a plurality of horizontally disposed longitudinally movable flights extended longitudinally thereof and arranged one above the other within said housing, means for feeding fruit to be dried to one end of the lowermost flight, a conveyer extending transversely of the adjacent ends of the lower and upper flights for transferring the fruit from one end of the lower flight onto the corresponding end of the corresponding flight immediately above the same and traveling in an opposite direction, means for receiving the dried fruit from the discharge end of the uppermost flight, and means for drying the fruit while in said housing.

7. A drier comprising a housing, an endless conveyer therein having an upper run and a lower run traveling in opposite directions, said conveyer capable of supporting the fruit to be dried on the upper surfaces of the lower and upper runs thereof, and for rotating the fruit as conveyed thereby, means for feeding fruit to be dried onto the upper surface of one end of the lowermost run, means for receiving the fruit from the opposite end of said run and for transferring the same onto the upper surface of the corresponding end of the run immediately above, means for receiving the fruit from the opposite end of the upper run, and means for causing an air circulation within the housing to dry the fruit as conveyed therethrough.

8. A drier comprising a housing, an endless traveling open conveyer therein, and consisting of horizontally disposed flights traveling successively in opposite directions, means for directing air downwardly onto the upper flight, means for feeding fruit to be dried onto one end of the lowermost flight, and means for transferring the fruit from the opposite end of said flight onto the adjacent end of the flight above.

9. A drier, comprising a housing, having an open bottom, an endless traveling open conveyer therein, and consisting of a plurality of horizontally disposed flights traveling successively in opposite directions, means for feeding fruit to be dried onto one end of the lowermost flight, means for transferring the fruit from the opposite end of said flight onto the adjacent end of the flight above, and means for drying the fruit as conveyed.

10. A drier comprising a housing having an open bottom, an endless traveling open conveyer therein, and consisting of a plurality of horizontally disposed flights traveling successively in opposite directions, means for feeding fruit to be dried onto one end of the lowermost flight, means for transferring the fruit from the opposite end of said flight onto the adjacent end of the flight above, means for forcing air downwardly through said housing and said open conveyer flights and discharging the same through the open bottom thereof for drying the fruit conveyed.

In testimony whereof I have signed my name to this specification in the presence of a subscribing witness.

GEORGE D. PARKER.

Witness:
D. B. RICHARDS.